United States Patent
Parker et al.

(10) Patent No.: US 11,358,557 B1
(45) Date of Patent: Jun. 14, 2022

(54) AIRBAG HOUSING WITH SACRIFICIAL SEAM

(71) Applicant: AUTOLIV ASP, INC., Ogden, UT (US)

(72) Inventors: Don Larry Parker, Syracuse, UT (US); Derek John Wiscombe, Morgan, UT (US); Adam Smith, Plain City, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 17/216,740

(22) Filed: Mar. 30, 2021

(51) Int. Cl.
*B60R 21/2165* (2011.01)
*B60R 21/207* (2006.01)

(52) U.S. Cl.
CPC ........ *B60R 21/2165* (2013.01); *B60R 21/207* (2013.01)

(58) Field of Classification Search
None
See application file for complete search history.

(56) References Cited

U.S. PATENT DOCUMENTS

| | | | | |
|---|---|---|---|---|
| 5,826,938 | A * | 10/1998 | Yanase | B60R 21/207 280/730.2 |
| 7,748,732 | B2 * | 7/2010 | Sella | B60R 21/201 280/728.3 |
| 8,752,863 | B2 * | 6/2014 | Festag | B60R 21/207 280/730.2 |
| 10,960,843 | B2 * | 3/2021 | Esparza | B60R 21/2165 |
| 2020/0377051 | A1 * | 12/2020 | Kobayashi | B60R 21/207 |

FOREIGN PATENT DOCUMENTS

| CN | 210416504 U | * | 4/2020 | ........... B60R 21/207 |
| DE | 102015205835 A1 | * | 10/2015 | ........... B60R 21/207 |

* cited by examiner

*Primary Examiner* — Faye M Fleming
(74) *Attorney, Agent, or Firm* — Harness, Dickey & Pierce, P.L.C.; Stephen T. Olson

(57) ABSTRACT

A housing for storing an inflatable airbag includes a first portion and a second portion that cooperate to at least partially define a chamber for storing the inflatable airbag. A hinge portion connects the first portion to the second portion such that the second portion is pivotable about the hinge portion from a closed position for retaining the inflatable airbag within the chamber to an open position for deployment of the inflatable airbag from the chamber. A sacrificial seam connects the first portion and the second portion when the inflatable airbag is stored within the chamber. The sacrificial seam includes a plurality of connection members breakable in response to a pressure from within the chamber from initial inflation of the inflatable airbag. The connection members each extend across the sacrificial seam in a first direction between the first and second portions of the housing and are configured to have a predetermined failure area adjacent one of the first portion and the second portion.

19 Claims, 4 Drawing Sheets

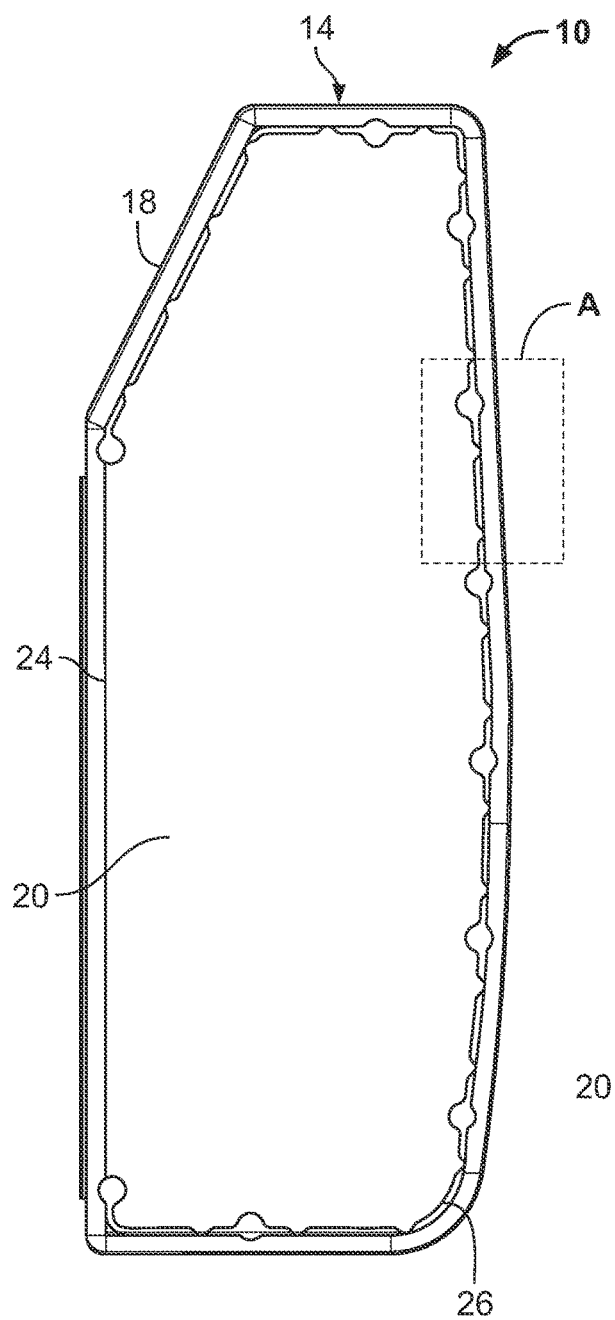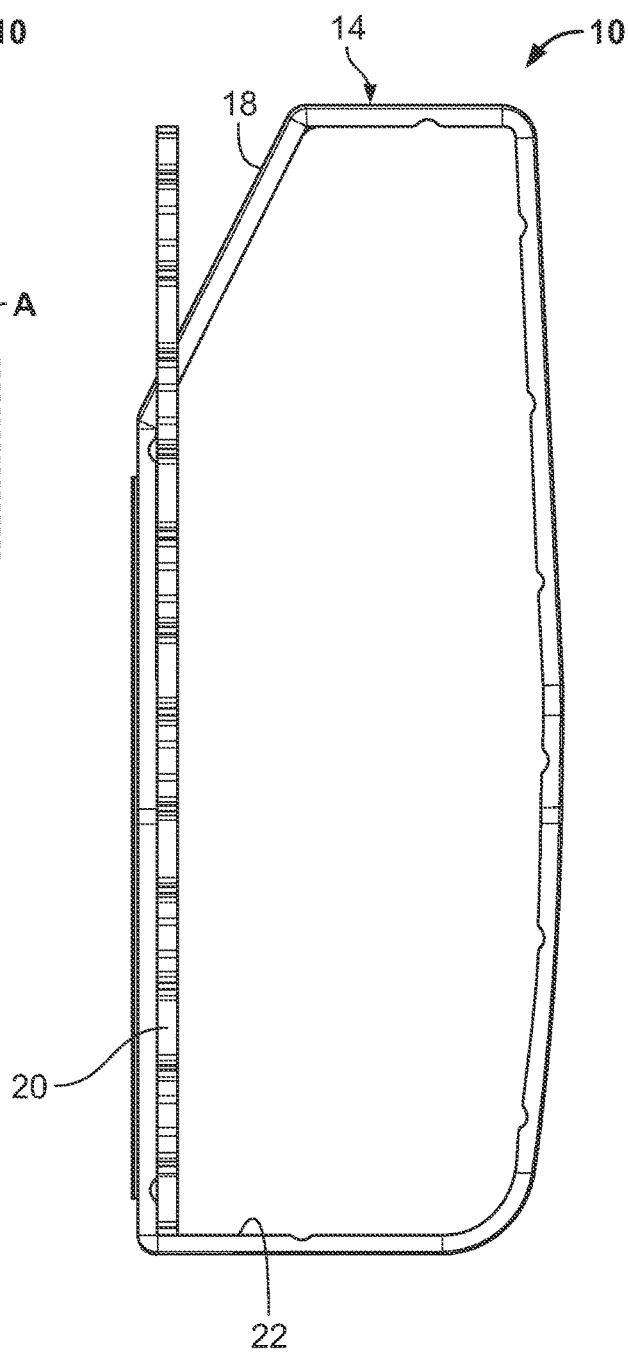
FIG. 2
FIG. 3

AIRBAG HOUSING WITH SACRIFICIAL SEAM

FIELD

The present disclosure generally concerns inflatable occupant restraint systems for vehicles. More particularly, the present disclosure relates to an airbag housing with a sacrificial seam.

BACKGROUND

This section provides background information related to the present disclosure which is not necessarily prior art.

Inflatable occupant restraints or airbags are commonly included on motor vehicles for passive occupant protection. Airbags used for frontal impact protection are generally installed in the vehicle steering wheel for the driver and behind the vehicle instrument panel for other front seat occupants. In addition to frontal impact protection, inflatable restraints are used for occupant protection from side impacts. For example, side curtain airbags are typically mounted along the roof rail of a vehicle and deploy in a downward direction to provide an energy absorbing structure between the head and upper torso of an occupant and the vehicle interior components.

Side impact protection may also be provided by airbag arrangements carried by a passenger seat of the vehicle. One such airbag arrangement is shown and described in commonly assigned U.S. Pat. No. 5,971,427 which is hereby incorporated by reference as if fully set forth herein. The airbag arrangements includes an airbag, an inflator assembly and a cover or housing. The cover includes first and second cover parts which are releasably interconnected by a strap. The strap includes a rupturable portion configured to break or tear in response to an inflation force from the airbag.

While known airbag housing have generally proven to be suitable for their intended uses, a continuous need for improvement in the relevant art remains.

SUMMARY

This section provides a general summary of the disclosure and is not a comprehensive disclosure of its full scope or all of its features.

It is a general object of the present teachings to provide an airbag housing with a sacrificial seam with consistent fracture points that require a low amount of force to break through during airbag deployment but are sufficiently robust to withstand handling throughout production and shipment to final installation.

In accordance with one particular aspect, the present teachings provide a housing for storing an inflatable airbag. The housing includes a first portion and a second portion that cooperate to at least partially define a chamber for storing the inflatable airbag. A hinge portion connects the first portion to the second portion such that the second portion is pivotable about the hinge portion from a closed position. The closed position retains the inflatable airbag within the chamber and the hinge portion in an open position allows for deployment of the inflatable airbag from the chamber. A sacrificial seam connects the first portion and the second portion when the inflatable airbag is stored within the chamber. The sacrificial seam includes a plurality of connection members that are breakable in response to a pressure from within the chamber due to an initial inflation of the inflatable airbag. The connection members each extend across the sacrificial seam in a first direction between the first and second portions of the housing and are configured to have a predetermined failure area adjacent one of the first portion and the second portion.

In accordance with another particular aspect, the present teachings provide an airbag arrangement including an inflatable airbag and a housing. The housing defines a cavity normally storing the inflatable airbag. The housing includes a main body and a door pivotally connected to the main body at a hinge portion for movement between a closed position and an open position. A sacrificial seam normally maintains the door in the closed position by connecting the door and the main body when the inflatable airbag is stored within the housing. The sacrificial seam includes a plurality of connection members breakable in response to a pressure from within the housing from initial inflation of the inflatable airbag. The connection members each include a minimum cross-sectional area defining a predetermined failure area adjacent the main body of the housing such that the connection members remain connected to the door upon failure.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations. The drawings are not intended to limit the scope of the present disclosure.

FIG. 2 is side view of the airbag arrangement of FIG. 1 removed from the vehicle seat for purposes of illustration, the airbag arrangement illustrated with a door of a housing in a closed position, a sacrificial seam between the door and a main body of the housing remaining intact prior to deployment of an airbag.

FIG. 3 is a side view similar to FIG. 2, the door of the housing shown articulated to an open position after the airbag has been deployed and the sacrificial seam opened.

DETAILED DESCRIPTION

One or more example embodiments will now be described more fully with reference to the accompanying drawings. The one or more example embodiments are provided so that this disclosure will be thorough and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, and that the example embodiment should not be construed to limit the scope of the present disclosure. Well-known processes, well-known device structures, and well-known technologies are not described herein in detail.

The phrases "connected to", "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "adjacent" refers to items that are in close physical proximity with each other, although the items may not necessarily be in direct contact. The phrase "fluid communication" refers to two features that are connected such that a fluid within one feature is able to pass into the other feature. "Exemplary" as used herein means serving as a typical or representative example or instance and does not necessarily mean special or preferred.

Figure 1:
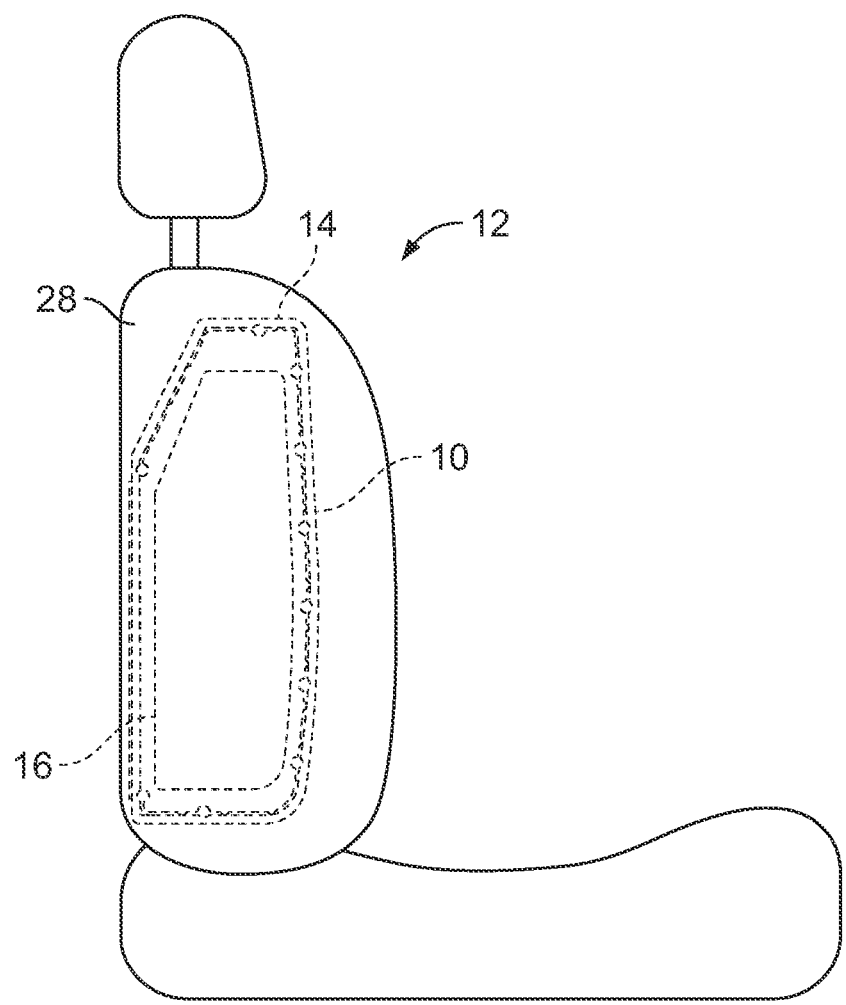
FIG. 1 is an environmental view of an airbag arrangement in accordance with the present teachings shown operatively associated with a vehicle seat.
Figure 4:
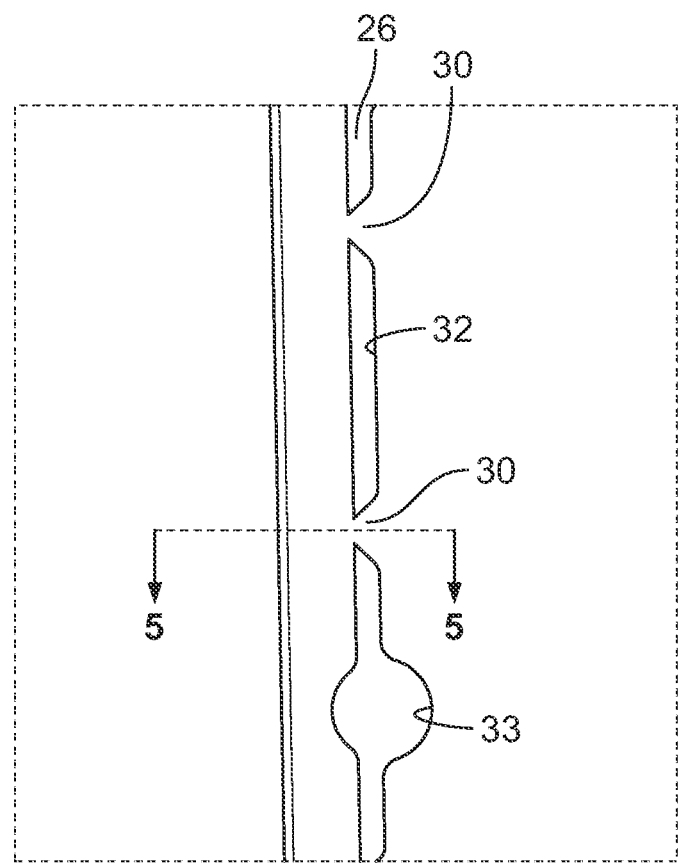
FIG. 4 is an enlarged of area A of FIG. 2.

With general reference to the drawings and particular reference to the environmental view of FIG. 1, an airbag arrangement in accordance with the present teachings is illustrated and generally identified at reference character 10. The airbag arrangement 10 is shown in FIG. 1 operatively incorporated into a vehicle seat 12. The particular application shown in the environmental view of FIG. 1 will be understood to be exemplary. In this regard, the present teachings may be adapted for other vehicle seats. Furthermore, the present teachings may be adapted for airbag arrangements other than vehicle seat mounted airbag arrangements.

The airbag arrangement 10 of the present teachings is shown to generally include a housing 14 and an inflatable airbag 16. The housing 14 includes a first portion or main body 18 and a second portion or door 20. The first and second portions 18 and 20 cooperate to define a chamber 22 for normally storing the airbag 16 prior to deployment of the airbag 16.

A hinge portion or living hinge 24 connects the first portion 18 to the second portion 20. As used herein, the term "living hinge" shall me a hinge portion integrally formed with the material of the first and second portions 18 and 20. The hinge portion 24 extends around a first section of a perimeter of the second portion 20 and provides for pivotal movement of the second portion 20 relative to the first portion 18 from a closed position to an open position. The closed position is shown in FIGS. 1 and 2. The open position is shown in FIG. 3.

A sacrificial seam 26 extends about a second section of the perimeter of the second portion 20 and normally connects the first and second portions 18 and 20. In the embodiment illustrated, where the airbag arrangement 10 is specifically intended for mounting to a lateral side of a seatback 28 of a vehicle seat 12, the hinge portion 24 extends along a rearward facing side of the second portion 20 and the sacrificial seam 26 extends around at a frontward facing side of the second portion 20. As shown, the sacrificial seam 26 may also extend along upper and lower sides of the second portion 20 such that the sacrificial seam 26 and the hinge portion 20 cooperate to substantially extend around the entire perimeter of the second portion 20. The sacrificial seam 26 is configured to withstand handling through production and shipment of the airbag arrangement 10 through final installation of the airbag arrangement 10.

The sacrificial seam 26 includes a plurality of connection members 30 that are breakable in response to a pressure from within the chamber 22 from initial inflation of the airbag 16. The connection members 30 each extend across the sacrificial seam 26 in a first direction $D_1$ that is perpendicular to the sacrificial seam 26. As will be discussed further below, the connection members 30 have predetermined failure areas adjacent one of the first portion 18 and the second portion 20. Explaining further, the connection members 30 are designed to consistently and repeatably fail at a plane adjacent one of the first and second portions 18 and 20. In the embodiment illustrated, the connection members 20 are designed to fail at the first portion 18 of the housing 14 such that connection members 20 remain with the pivotable, second portion 20 of the housing.

Adjacent connection members 30 of the sacrificial seam 26 are spaced apart from one another in a second direction $D_2$. The second direction $D_2$ is perpendicular to the first direction $D_1$ and parallel to the sacrificial seam 26. The adjacent connection members 30 are spaced apart from one another by openings or perforations 32 such that the sacrificial seam 26 defines a perforated perimeter about the second section of the perimeter of the second portion 20.

Each connection member 30 may include a minimum cross-sectional area at the failure area. As shown, this minimum cross-sectional area may be adjacent the first portion 18 of the housing. The connection members 30 may taper in the first direction $D_1$ as they extend from the second portion 20 of the housing 14 to the first portion 18 of the housing 14. As such, the connection members 30 may have a maximum cross-sectional area and a maximum width in the first direction $D_1$ adjacent the second portion 20 and a minimum width adjacent the first portion 18. In this regard, the connection members 30 may be wedged shaped in the first direction $D_1$ parallel to the sacrificial seam 26.

Figure 5:
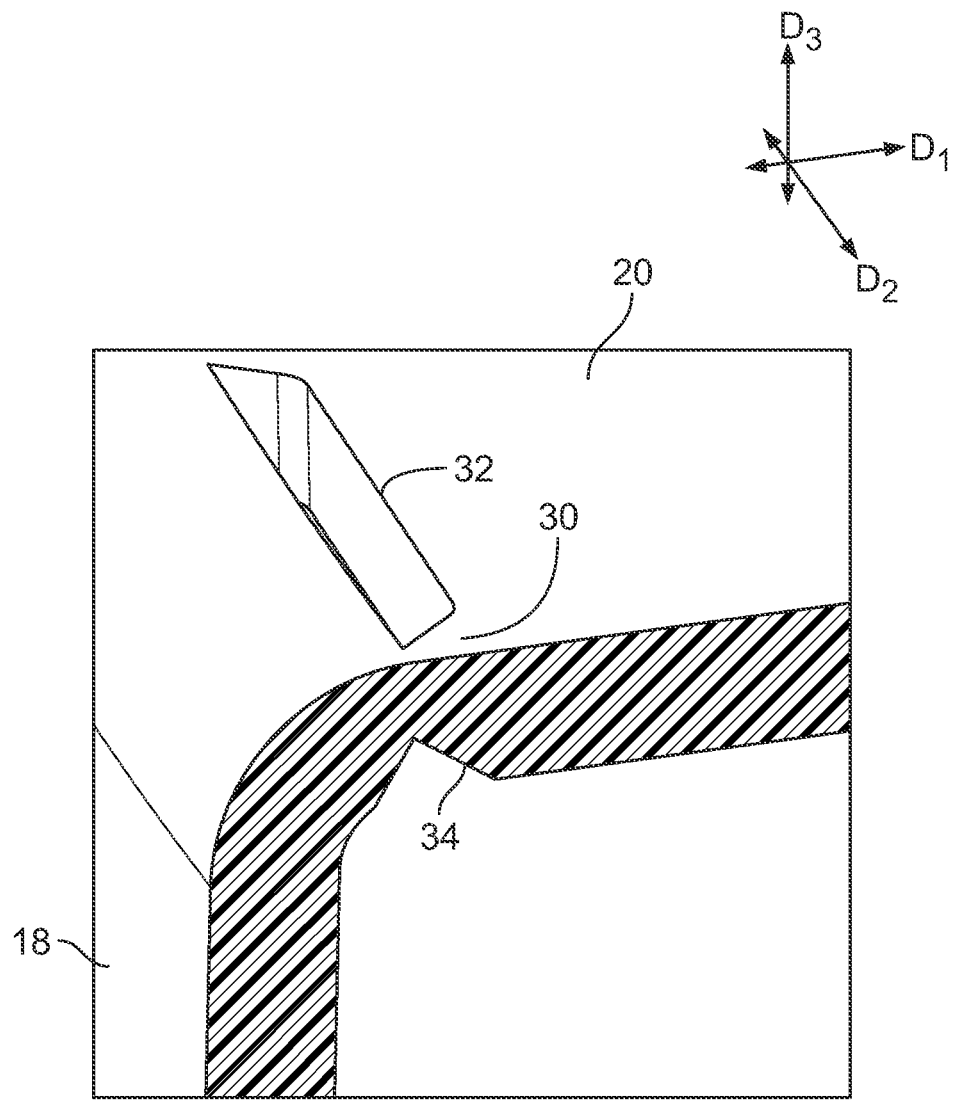
FIG. 5 is a cross-sectional view taken along the line 5-5 of FIG. 4.

As shown, the connection members 30 may have a thickness in a third direction $D_3$ that tapers. The third direction $D_3$ may be perpendicular to the first direction $D_1$ and the second direction $D_2$. As particularly shown in the cross-sectional view of FIG. 5, a lower surface 34 of the connection members 30 may taper as they extend from the second portion 20 of the housing 14 to the first portion 18 of the housing 14. As such, the connection members 30 may have a maximum thickness in the third direction $D_3$ adjacent the second portion 20 of the housing 14 and a minimum thickness in the third direction $D_3$ adjacent the first portion 18 of the housing 14.

The housing 14 may be injection molded of plastic. Some of the opening 32 of the sacrificial seam 26 between adjacent connection members 30 may include circular portions 33. The circular portions 33 may accommodate pins during an injection molding process to form the housing 14.

As noted above, the airbag arrangement 10 of the present teachings may be mounted to a lateral side of a seatback 28 of a vehicle seat 12. The vehicle seat 12 may be a front seat, a rear seat or any other seat within a vehicle. The airbag 16 is contained in the housing 14 which is generally mounted to a metallic seat frame of the vehicle seat 12. The housing 14 is then surrounded in a conventional manner by foam cushioning and a seat cover where it is concealed until such a time that deployment of the airbag 16 is required. Upon sensing of a predetermined accident condition, the airbag 16 is conventionally inflated by an inflator (not shown). The inflator is typically carried by the vehicle seat 12.

Initial inflation of the airbag 16 creates a pressure within the cavity 22 of the housing 14. This pressure within the cavity 22 results in failure of the connection members 30. In the embodiment illustrated, failure of the connection members 30 occurs at juncture of the connection members 30 with the first portion or main body 18 of the housing 14. The second portion or door 20 of the housing can then rotate from the closed position (as shown in FIGS. 1 and 2) to the open position (as shown in FIG. 3). Because failure of the connection members 30 occurs at juncture of the connection members 30 with the first portion or main body 18, the connection members 30 completely remain with the door 20. A smooth line along an edge of the first portion 18 of the housing 14 effectively remains. As such, no parts of the housing 14 separate from the housing 14 and the housing 14 is free of sharp projections that may otherwise come into contact with the airbag 16 during deployment.

Accordingly, it will now be appreciated that present teachings provide a housing 12 for an airbag arrangement 10 that has a durable and robust closure arrangement and that opens in such a manner to allow the airbag 16 to quickly and reliably deploy from the housing 12.

While specific embodiments and applications of the present disclosure have been illustrated and described, it is to be understood that the invention is not limited to the precise configuration and components disclosed herein. Various modifications, changes, and variations, which will be apparent to those skilled in the art, may be made in the arrangement, operation, and details of the methods and systems of the present disclosure without departing from the spirit and scope of the disclosure.

What is claimed is:

1. A housing for storing an inflatable airbag, the housing comprising:
    a first portion;
    a second portion cooperating with the first portion to at least partially define a chamber for storing the inflatable airbag;
    a hinge portion connecting the first portion to the second portion such that the second portion is pivotable about the hinge portion from a closed position for retaining the inflatable airbag within the chamber to an open position for deployment of the inflatable airbag from the chamber; and
    a sacrificial seam connecting the first portion and the second portion when the inflatable airbag is stored within the chamber, the sacrificial seam including a plurality of connection members breakable in response to a pressure from within the chamber from initial inflation of the inflatable airbag, the connection members each extending across the sacrificial seam in a first direction between the first and second portions of the housing and configured to have a predetermined failure area adjacent one of the first portion and the second portion,
    wherein adjacent connection members of the plurality of connection members are spaced apart from one another in a second direction, the second direction perpendicular to the first direction such that the sacrificial seam defines a perforated perimeter around at least a portion of the second portion of the housing.

2. The housing for storing an inflatable airbag of claim 1, wherein the predetermined failure area of each connection member is adjacent the first portion of the housing such that the connection members remain connected to the second portion upon failure.

3. The housing for storing an inflatable airbag of claim 1, wherein each connection member of the plurality of connection members has a minimum cross-sectional area at the predetermined failure area.

4. The housing for storing an inflatable airbag of claim 1, wherein each connection member of the plurality of connection members tapers in the first direction.

5. The housing for storing an inflatable airbag of claim 1, wherein each connection member of the plurality of connection members has a thickness perpendicular to the first direction and perpendicular to the sacrificial seam, the thickness having a minimum thickness dimension at the predetermined failure area.

6. The housing for storing an inflatable airbag of claim 5, wherein the minimum thickness dimension of each connection member is adjacent the first portion of the housing.

7. The housing for storing an inflatable airbag of claim 6, wherein the thickness of each connection member of the plurality of connection members has a maximum thickness dimension adjacent the second portion of the housing.

8. The housing for storing an inflatable airbag of claim 7, wherein each connection member of the plurality of connection members has a width parallel to the sacrificial seam, the width having a minimum width dimension at the predetermined failure area.

9. The housing for storing an inflatable airbag of claim 1, wherein each connection member of the plurality of connection members has a thickness perpendicular to the first direction and perpendicular to the sacrificial seam and further has a width parallel to the sacrificial seam, the thickness having a minimum thickness dimension at the predetermined failure area and the width having a minimum width dimension at the predetermined failure area.

10. The housing for storing an inflatable airbag of claim 1, in combination with the inflatable airbag, the inflatable airbag normally stored in the housing.

11. The housing and the inflatable airbag of claim 1, in combination with a vehicle seat, the housing attached to the vehicle seat.

12. The housing for storing an inflatable airbag of claim 1 in combination with the inflatable airbag, the inflatable airbag stored in the chamber.

13. The housing for storing an inflatable airbag and inflatable airbag of claim 12, in combination with a vehicle seat, the housing attached to the vehicle seat.

14. A housing for storing an inflatable airbag, the housing comprising:
    a first portion;
    a second portion cooperating with the first portion to at least partially define a chamber for storing the inflatable airbag;
    a hinge portion connecting the first portion to the second portion such that the second portion is pivotable about the hinge portion from a closed position for retaining the inflatable airbag within the chamber to an open position for deployment of the inflatable airbag from the chamber; and
a sacrificial seam connecting the first portion and the second portion when the inflatable airbag is stored within the chamber, the sacrificial seam including a plurality of connection members breakable in response to a pressure from within the chamber from initial inflation of the inflatable airbag, the connection members each extending across the sacrificial seam in a first direction between the first and second portions of the housing and configured to have a predetermined failure area adjacent one of the first portion and the second portion,
    wherein each connection member of the plurality of connection members tapers in the first direction.

15. A housing for storing an inflatable airbag, the housing comprising:
    a first portion;
    a second portion cooperating with the first portion to at least partially define a chamber for storing the inflatable airbag;
    a hinge portion connecting the first portion to the second portion such that the second portion is pivotable about the hinge portion from a closed position for retaining the inflatable airbag within the chamber to an open position for deployment of the inflatable airbag from the chamber; and
    a sacrificial seam connecting the first portion and the second portion when the inflatable airbag is stored within the chamber, the sacrificial seam including a plurality of connection members breakable in response to a pressure from within the chamber from initial inflation of the inflatable airbag, the connection members each extending across the sacrificial seam in a first direction between the first and second portions of the housing and configured to have a predetermined failure area adjacent one of the first portion and the second portion, wherein each connection member of the plurality of connection members has a thickness perpendicular to the first direction and perpendicular to the sacrificial seam, the thickness having a minimum thickness dimension at the predetermined failure area.

16. The housing for storing an inflatable airbag of claim 15, wherein the minimum thickness dimension of each connection member is adjacent the first portion of the housing.

17. The housing for storing an inflatable airbag of claim 16, wherein the thickness of each connection member of the plurality of connection members has a maximum thickness dimension adjacent the second portion of the housing.

18. The housing for storing an inflatable airbag of claim 17, wherein each connection member of the plurality of connection members has a width parallel to the sacrificial seam, the width having a minimum width dimension at the predetermined failure area.

19. A housing for storing an inflatable airbag, the housing comprising:

a first portion;

a second portion cooperating with the first portion to at least partially define a chamber for storing the inflatable airbag;

a hinge portion connecting the first portion to the second portion such that the second portion is pivotable about the hinge portion from a closed position for retaining the inflatable airbag within the chamber to an open position for deployment of the inflatable airbag from the chamber; and a sacrificial seam connecting the first portion and the second portion when the inflatable airbag is stored within the chamber, the sacrificial seam including a plurality of connection members breakable in response to a pressure from within the chamber from initial inflation of the inflatable airbag, the connection members each extending across the sacrificial seam in a first direction between the first and second portions of the housing and configured to have a predetermined failure area adjacent one of the first portion and the second portion, wherein the first and second portions are integrally formed to include the sacrificial seam such that the sacrificial seam is injection molded into the housing and connects the first and second portions until deployment of the inflatable airbag.

* * * * *